June 18, 1957 F. C. MOCK 2,796,136
POWER CONTROL SYSTEM FOR TURBINE PROPELLER ENGINES
Filed March 15, 1947 5 Sheets-Sheet 1

FIG.1

INVENTOR
FRANK C. MOCK
BY
ATTORNEY though the present invention is not limited to such a combination.

United States Patent Office 2,796,136
Patented June 18, 1957

2,796,136
POWER CONTROL SYSTEM FOR TURBINE PROPELLER ENGINES

Frank C. Mock, South Bend, Ind., assignor to Bendix Aviation Corporation, South Bend, Ind., a corporation of Delaware Application March 15, 1947, Serial No. 734,937

5 Claims. (Cl. 170—135.74)

This invention relates to a power control system for gas turbine engines of the variable speed, variable load type, as where the engine has a driving connection with a variable pitch propeller and the power output is controlled by varying the rate of fuel feed and/or the pitch of the propeller blades. In engines of this type, especially when used on aircraft, the overall speed range may extend, for example, between zero and 13,000 R. P. M., the idling range being spread over say 10,000 R. P. M. and the power range over 3000 R. P. M. It thus becomes desirable to control the power output by changing the rate of fuel feed at substantially constant engine speed and in many instances at maximum engine speed, the propeller blades being adjusted to absorb the increase in power as determined by the increase in the rate of fuel feed. To do this without permitting the engine to overspeed and without involving considerable surging, requires that the pitch angle or thrust of the propeller blades be substantially coordinated with or follow closely the power output as determined by the change in fuel valve position or the rate of fuel feed during acceleration and deceleration of the engine. If we assume that at idling the pitch of the propeller blades is at substantially zero or in the neighborhood of 5°, it may be necessary to increase the propeller pitch angle from this low pitch position to a substantially 100% power position of say 30° within a relatively short period of time, and if the fuel feed valve or needle is retracted suddenly without coordinated increase in propeller thrust, the engine will tend to run away with itself, or at best, the control will surge violently. Conversely, to obtain quick and smooth decrease in power, it is desirable to have a minimum lag between power reduction and the reduction in propeller thrust.

The problem of coorelating the contour of the fuel feed valve or needle with the propeller governor datum so that each fuel valve position corresponds to a fixed propeller pitch must also take into consideration changes in altitude or air density and air speed, since decrease in air density requires a corresponding decrease in fuel feed at a given engine speed in order to maintain engine or burner temperature within safe operating limits, and at the same time, due to the rarefied air, a given propeller pitch will absorb less power. With respect to air speed, to maintain a given engine speed at a given increase in the rate of fuel feed may under certain conditions require less pitch at low air speeds than is required to maintain the same engine speed at higher air speeds. Hence an air speed corrective factor for the propeller governor may be desirable.

An object of the present invention, therefore, is to provide a control system for gas turbine propeller engines wherein the propeller thrust is closely coordinated with power output as determined by the rate of fuel feed under varying conditions of operation.

Another object is to provide a power control system for engines having an interconnected fuel and propeller pitch control wherein a change in the rate of fuel feed produces a change in propeller pitch in an approximately correct ratio, with auxiliary controls assisting the governor to more exactly and more quickly coordinate the rate of change of propeller pitch with a given change in power output.

Another object is to provide a control for engines of the type specified having an interconnected propeller pitch control and fuel feed valve wherein means are provided for modifying the action of the propeller pitch control as a function of engine speed and/or air speed.

A further object is to provide a control for engines of the type specified which will automatically maintain the temperature in the burner system within predetermined safe operating limits.

A still further object is to provide a control for gas turbine engines embodying improved means for correlating engine torque, propeller pitch and power output.

The foregoing and other objects and advantages will become apparent in view of the following description taken in conjunction with the drawings, wherein.

Gas turbine propeller engine

Figure 1:
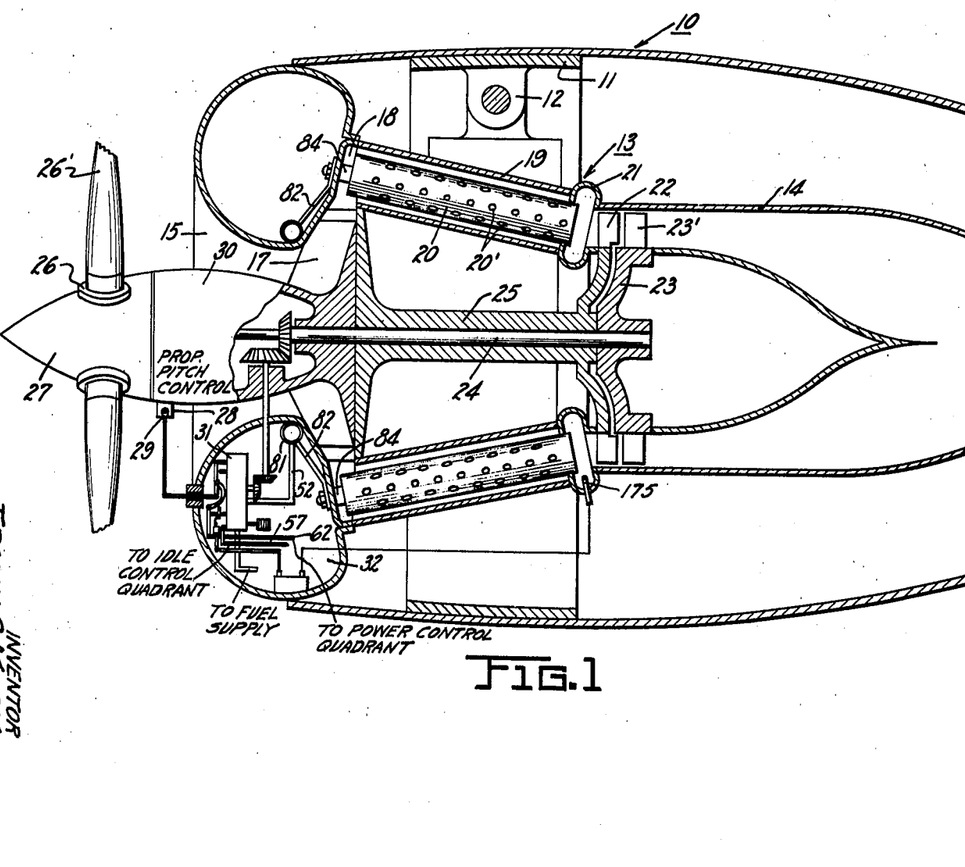
Figure 1 is a substantially central longitudinal sectional view of a gas turbine propeller engine for aircraft incorporating a fuel feed and power control system in accordance with the invention.

Referring first to Figure 1, an aircraft engine nacelle, indicated at 10, has supported therein as by means of ring 11 and brackets 12 a gas turbine engine, generally indicated at 13 and including an outer casing 14 flared or curved at its front extremity to define an air inlet 15 and contoured at its rear extremity to define a reaction tube 16. A dynamic air compressor 17, shown as of the centrifugal type but which may be of the axial flow or of any other suitable type, forces air into an annular header 18 which directs it to a plurality of annularly spaced combustion chambers 19, each containing a burner or generator tube 20 having air inlet holes 20' in the peripheral walls thereof. The burners 20 discharge into a collector ring 21 arranged to direct the hot air and products of combustion through a set of stationary distributing blades 22 against the blades 23' of a turbine rotor 23. The turbine 23 and air compressor 17 are shown as mounted on a common shaft 24 rotatably supported by a bearing 25. Air entering the inlet 15 is picked up by the compressor, which acts to direct the air into the header 18 and burner chambers 19 and thence into the burners 20 through the holes 20', where heat is added by the combustion of fuel. The expanded air and products of combustion are directed against the blades 23' of the turbine 23 to drive the compressor 17 and also a propeller 26 provided with variable pitch propeller blades 26', the said blades projecting into a bodily rotatable housing 27 containing the gear and bearing assembly for the said blades as well as the means for actuating the blades to different angles or pitch. The means for changing the pitch of the propeller blades is preferably of a type such that the pitch changing mechanism acts when a control element or lever is moved without waiting for a change in engine speed. An example is, illustrated in Figure 3 and will subsequently be described; it includes a depending housing 28 mounting a lever 29, which when rotated in a counterclockwise direction or to the right in Figures 1, 2 and 3, increases the pitch of the propeller blades, and when rotated in a clockwise direction or to the left, acts to decrease the pitch of the blades. A predetermined part of the energy derived from the expanded gases may be utilized to obtain a jet thrust, or the exhaust gases only may be utilized in this manner. The drive may be transmitted from the shaft 24 to the propeller 26 through suitable reduction gearing, not shown, contained in an accessory housing 30.

Fuel feed

Figures 2, 3:
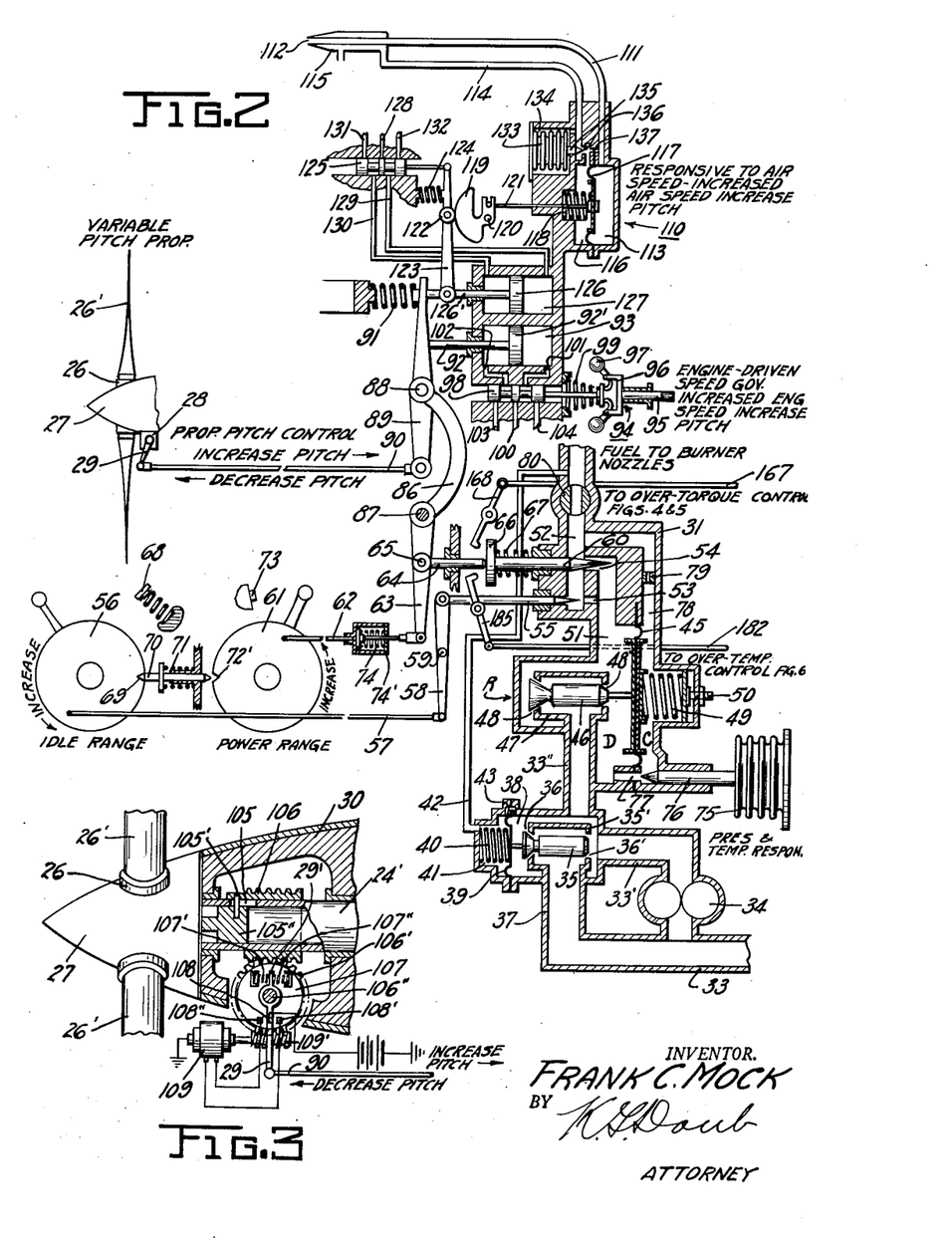
Figure 2 is a schematic view of the fuel feed and power control system of Figure 1.
Figure 3 is a diagrammatic illustration of a suitable type of propeller pitch control mechanism.

Referring now to Figure 2, the control apparatus illustrated schematically in this figure is mounted in a housing 31, which for convenience is shown disposed in the chamber 32 defined by front curved portion of the casing 14 in Figure 1; it comprises a fuel metering device provided with a fuel inlet conduit 33 which receives fuel from a suitable source of supply such as a fuel tank, not shown, and has a branch 33' in which is located a fuel pressuring means such as an engine driven pump 34 which delivers fuel under a controlled pressure to a regulating unit R by way of conduits 33' and 33". Fuel pump delivery pressure may be maintained at a predetermined value over and above discharge or nozzle pressure by means of a balanced by-pass valve 35 mounted in a housing 35' having fuel inlet ports 36 and 36' and communicating with the supply conduit 33 by way of a return conduit 37. The valve housing 35' is mounted in a chamber 38 communicating the conduits 33' and 33". A diaphragm 39, backed by a spring 40, is connected to the stem of the valve 35 and forms a movable wall between the chamber 38 and a chamber 41, the latter being vented to metered fuel or discharge nozzle pressure by means of a conduit 42. Spring 40 determines the pressure above fuel discharge pressure at which the valve 35 will open and by-pass fuel to the low pressure side of the pump 34. The chamber 41 may be vented to the chamber 38 by means of a bleed 43 to permit air to escape by way of conduit 33" and regulator R to the fuel discharge nozzles and thus insure proper functioning of the valve 35.

The regulator unit generally indicated at R includes a diaphragm 45, which provides a movable partition or wall between chambers D and C, and a balanced fuel valve 46, which has its stem connected to said diaphragm, is mounted in a housing 47 receiving fuel from the conduit 33" and provided with ports 48, 48' discharging into chamber D. The diaphragm 45 is engaged by a spring 49 adjustable by means of a screw 50. Spring 49 is of a relatively low spring rate such as will maintain a predetermined, substantially constant differential across the diaphragm 45.

Fuel flows from chamber D by way of a conduit 51 to metered fuel conduit 52 either through idle metering restriction 53, or through both the idle metering restriction 53 and a power metering restriction 54. The idle restriction 53 is controlled by an idle needle valve 55 which is connected to a pilot's quadrant 56 by means of suitable linkage including rod 57 and a lever 58 pivoted or fulcrumed at 59; while the power restriction 54 is controlled by power needle valve 60 which is operatively connected to a pilot's power quadrant 61 by means of suitable linkage including rod 62, arm 63 and a push rod or link 64 pivoted to the arm 63 at 65. The power needle 60 is provided with a contact head 66 and is urged towards its retracted position against the push rod 64 by means of a spring 67.

The idle quadrant 56 is adapted to control the fuel feed to the engine over the idle range; its low idle position is determined by a resilient stop 68 so that it may be moved back to lower metering positions, as in starting, and still further retracted to completely cut off flow of fuel to the engine; while its high idle position is determined by a notch 69 in which the one head of a detent plunger 70 engages, the said plunger being normally urged towards seated position by spring 71. The power quadrant 61 is adapted to control the fuel feed to the engine over the power range; it is connected to the propeller pitch control lever 29 to coordinate the pitch of the propeller blades with fuel feed in a manner to be described. Its low power position is determined by engagement of the adjacent beveled or cammed end of plunger 70 in a notch 72' when the idle quadrant is being used, and its high power position by stop 73. When the idle quadrant 56 is rotated to high idle position, it will automatically be latched in such position, while at the same time it will release or unlatch the power quadrant 61, and vice versa.

The rod 62 is made in two parts and connected by an override spring 74 mounted in a housing 74', the arrangement being such that when the power quadrant 61 is rotated counterclockwise or in a power increasing direction, spring 74 is compressed and a resilient pull is exerted on the propeller pitch control lever 29, the fuel valve 60 being then opened coincident with change in propeller pitch, as will be more fully hereinafter described in connection with Figure 3.

To compensate for changes in density of the air flowing to the engine, means are provided for varying the differential across the feed restrictions 53 and 54 at a given position of the feed valves or needles 55 and 60, such means in the form shown comprising a capsule or bellows 75 so located as to be exposed to ram pressure and temperature, such as in the chamber 32, Figure 1. A pressure and temperature responsive capsule suitable for such service is illustrated and described in U. S. Patent No. 2,376,711, granted May 22, 1945. The capsule 75 has a needle 76 connected to the movable end thereof which is adapted to control the area of a port 77 communicating chamber D with chamber C across the diaphragm 45. The chamber C communicates by way of a passage 78 and calibrated restriction 79 with the metered fuel conduit 52.

The quantity of fuel supplied to the burners may be varied by varying the area of feed restrictions 53, 54 and/or by varying the head (pressure in chamber D minus pressure in conduit 52) causing flow. The area of the feed restrictions is controllable manually through needle valves 55 and 60, whereas the differential across said restrictions is under the control of the regulator R and its interrelated density controlled valve 76. Opening or closing movements of feed valves 55 and/or 60 momentarily varies the pressure in chamber D and consequently changes the differential across diaphragm 45 from the value set by spring 49; however, the valve 46 is immediately repositioned to restore the differential across said diaphragm and also across said feed restrictions, the differential thereafter being maintained constant.

As the density of the air decreases (which may result from a gain in altitude assuming the engine is used in an aircraft) the temperature of the burners will tend to increase at a given rate of fuel flow, since the compressor will deliver less air; also, it will require less power to drive it. Hence, the fuel flow to the burners must be reduced with a decrease in air density to maintain the turbine speed substantially constant for a given setting of the quadrants 56 and 61. It is a function of the variable port or orifice 77 and restriction 79 to vary the differential across the feed restrictions 53 and 54 with changes in air pressure and temperature to thereby vary the fuel flow to the burners.

The regulator R functions to establish an absolute pressure in chamber D which is greater than the pressure in C by the pressure value of the spring 49, and at the same time it establishes an absolute pressure in chamber C sufficiently greater than the pressure in metered fuel conduit 52 that the fuel flowing through orifice 77, as determined by the area of orifice 77 and the constant head thereacross as maintained by spring 49, can be forced through the restriction 79 into the conduit 52. The metering head across the feed restrictions 53 and 54 (pressure in chamber D minus the pressure in conduit 52) is equal to the head across orifice 77 (pressure in D minus the pressure in C) plus the head across restriction 79 (pressure in C minus the pressure in conduit 52). The spring 49 and diaphragm 45 maintain a constant differential across orifice 77 and hence the flow through orifice 77 will increase or decrease as the needle valve 76 opens or closes. Since the fuel flowing through orifice 77 must also flow through the fixed restriction 79, it follows that the head across the latter will increase or decrease with opening or closing of needle 76. As a consequence, the total drop in pressure from chamber D to conduit 52 will increase or decrease as the needle 77 opens or closes. Thus, as the capsule 75 expands in response to a decrease in the density of the air flowing to the engine and needle 76 progressively restricts orifice 77, the differential across feed restrictions 53 and 54 is correspondingly decreased and less fuel will be fed for any given area of feed restrictions 53 and 54. A fuel feeding system for gas turbines embodying the foregoing density control system forms the subject matter of my copending application Serial No. 620,755, filed November 6, 1945, now Patent No. 2,644,513; it is not, therefore, specifically claimed herein but only in conjunction with parts which combine to produce a new combination of elements for obtaining a new or improved result.

A fuel cut-off valve 80 (Figure 2) is shown mounted in the metered fuel conduit 52 for positively cutting off flow of fuel to a fuel manifold 81 (Figure 1) and thence by way of individual fuel lines 82 to burner nozzles 84, there being one of the latter for each burner 20.

*Propeller pitch correction by engine-driven speed governor*

Arms 86 and 63 form a bell crank member which is pivotally mounted on a shaft 87. The upper or outer end of arm 86 is pivotally connected at 88 to a rocking lever 89, the latter at its lower end connecting by means of a link rod 90 with the propeller pitch control element 29.

The upper end of the rocking lever 89 is normally urged in a pitch decreasing direction by a spring 91 against the controlling or modifying action of a push rod 92 connected to a servo piston 92', the latter being mounted in a piston cylinder or chamber 93. An engine driven speed governor, generally indicated at 94, controls admission of fluid pressure to the cylinder 93; it comprises a shaft 95 adapted to be driven from the engine and provided at its inner end with a bracket 96 carrying governor weights 97 whose inwardly extending arms actuate a servo valve 98 against the resistance of a spring 99. When the weights 97 move outwardly through centrifugal force, they move valve 98 to the left and admit high pressure fluid such as oil to the cylinder 93 through passages 100 and 101 on the right hand side of piston 92' and move lever 89 in a direction to increase the propeller pitch, the left hand side of said piston then being vented through passages 102 and 103. When the centrifugal action of the governor is such as to permit the spring 99 to move valve 98 to the right, high pressure oil enters through passage 102 on the left of piston 92' while drainage from the right of said piston ensues through passages 101 and 104, thereby moving rod 92 to the right in a direction to permit spring 91 to move lever 89 in a pitch decreasing direction.

Whenever the fuel feed as determined by the setting of the needle 60 is sufficient to cause the engine to speed up at a rate greater than that predetermined by the correlated governor spring 99 and governor weights 97, the governor weights will operate the servo piston 92 through the servo valve 98 to immediately increase the pitch of the propeller blades to a point where the propeller will absorb the power output at the desired governed speed, this engine driven governor 94 functioning primarily to prevent overspeeding and to introduce a corrective factor for any variation from the approximately correct ratio of propeller pitch coordination between the fuel valve 60 and propeller governer 28.

*Basic propeller pitch control*

Figure 3 illustrates a type of basic or main propeller pitch control mechanism adapted for the present invention. To avoid excessive drawings and descriptive matter, it is primarily diagrammatic and includes only such parts as are necessary for an understanding of its operation. In the form shown, it is of the electric type, but it will be obvious to those skilled in the art that hydraulic or other types of control mechanism could be substituted. The propeller 26 is carried by a hollow shaft 24' (which may represent an extension of the shaft 24, Figure 1), formed with an elongated slot 105. A cylindrical sleeve-like gear 106 is slidingly mounted on the shaft 24' while at the same time it has a driving connection with said shaft and also with a propeller pitch gear rack 105'' by means of a pin 105' projecting through the slot 105. The sleeve gear 106 is actuated longitudinally on the shaft 24' by means of a gear 106' rotatably mounted on a shaft 106'' and held in continual mesh with the gear 106. A disc shaped plate 107 is also secured on the shaft 106'' for rotation with the gear 106' and carries a pair of opposed springs 107' and 107'' which abut an arm 29' constituting an extension of the pitch control lever 29, the latter being loosely mounted on shaft 106'' and carrying a contact 108 adapted to engage contacts 108' and 108'' when the arm or lever 29 is rotated a limited distance in opposite directions, the contacts 108' and 108'' being connected to the plate 107. The contact 108 is connected to the positive terminal of a battery or other source of potential while the contacts 108' and 108'' lead to the input brushes of a direct current reversible motor 109 arranged to drive a worm gear 109' in mesh with the gear 106'. The gear rack 105'' is arranged to rotate the propeller blades 26' in pitch changing directions through suitable drive connections, not shown, with the base portions of the said propellers.

In operation, when the lever 29 is rotated counterclockwise by means of the quadrant 61, it moves the contact 108 in engagement with the contact 108', whereupon the motor 109 is energized and drives the gear 106' counterclockwise, which slides sleeve gear 106 and rack bar 105'' in a direction to increase the pitch of the propeller blades 26 irrespective of, or without waiting for a change in engine speed. As the gear 106' and plate 107 rotate counterclockwise to increase the pitch, the lever 29 follows and maintains electrical contact, since the quadrant 61 is then either being moved in a pitch increasing direction manually or its sudden movement has preloaded the spring 74, Figure 2, contact being maintained until a pitch setting is reached as determined by the setting of the lever 29, whereupon a slight further rotation of the plate 107 by motor 109 moves the contact 108' free of engagement with the contact 108, and the pitch-changing drive on the propeller blades ceases.

When the arm 29 is rotated in a clockwise direction, the reverse of the foregoing operation takes place, the gear 106' and plate 107 being also rotated clockwise, whereupon the contact 108 engages the contact 108'' and the motor 109 is reversed, the drive on the propeller continuing until a pitch setting is reached as determined by the setting of the lever 29, whereupon the motor 109 produces a slight additional rotation of the plate 107 and moves the contact 108'' clear of the contact 108'. It will be seen that there is a definite coaction set up between the power quadrant 61, the fuel valve needle 60 and the propeller pitch control mechanism. Thus, when the quadrant 61 is rotated counterclockwise or in a direction to open the fuel valve 60 and increase power output, the arm 29 simultaneously acts through the propeller pitch control mechanism just described to change the pitch of the propeller blades in a pitch increasing direction without waiting for a change in engine speed. However, the change in pitch does not take place instantly, since there must of necessity be a time lapse until the motor 109 starts to rotate and thereafter the change in pitch is more or less gradual, but due to preloading of the spring 74, Figure 2, retraction or opening movement of the fuel needle 60 is made concurrent or coincident with the change in pitch of the propeller blades irrespective of how gradual or how quickly such change takes place and also irrespective of how suddenly the power quadrant 61 is advanced.

Air speed correction

While the basic control is through coordination of fuel feed and propeller pitch by interconnecting the power needle 60 with the propeller pitch control in the manner heretofore described, it may be desirable to correct for air speed, since in order for the propeller to absorb the power output for any given rate of fuel feed, the angle of thrust of the propeller blades should vary at least roughly in proportion to the force of the air on said blades. Thus, at say 400 miles per hour, the propeller pitch required for absorbing a given power output at a given air density will be greater than at 200 miles per hour.

A device suitable for air speed correction or compensation is indicated generally at 110, Figure 2; it includes a Pitot tube construction mounted in the air stream past the craft and having a conduit 111 provided with an impact opening 112 at its intake or receiving end which is adapted to communicate impact pressure to a diaphragm hamber 113. Another conduit 114 has a static opening 115 at its receiving end and is adapted to communicate static pressure to a diaphragm chamber 116. A diaphragm 117 forms a movable wall between chambers 113 and 116, and the differential imposed on said diaphragm acts to move the latter to the left against the resistance of a calibrated spring 118. A cam 119 is pivotally anchored at 120 and is operatively connected to the diaphragm 117 by a rod 121, said cam engaging a roller or follower 122 carried by a lever 123 normally urged against the cam by a spring 124. At its one end (upper end in Figure 2) the lever 123 is pivotally connected to a servo valve 125 and at its opposite or lower end said lever is pivotally connected to the piston rod 126' of a servo piston 126 mounted in a cylinder or chamber 127. When the servo valve 125 is moved by cam 119 toward the left, high pressure fluid such as engine oil flows through conduits 128 and 129 to the cylinder 127 on the right hand side of the piston 126 and moves the latter to the left, causing rod 126' to rock lever 89 counterclockwise and move rod 90 in a direction to increase the propeller pitch, oil draining through conduits 130 and 131; and when cam 119 is rotated in a direction to permit spring 124 to move lever 123 and consequently the servo valve 125 to the right, high pressure fluid flows through conduits 128 and 130 to the left hand side of piston 126 and moves the latter to the right, thus permitting spring 91 to rotate lever 89 in a clockwise direction and move rod 90 in a pitch decreasing direction, oil then draining by way of conduits 129 and 132. Ordinarily, the action of the air speed correction is to override the engine driven governor, since the requirement will be for increased pitch beyond that set by the basic control.

Since actual air speed varies as a function of air density, and also as the square root of the difference between impact pressure and static pressure, an aneroid 133 is used for density correlation and the cam 119 is of parabolic or logarithmic contour to compensate for the square root relationship between air speed and the said pressure differential. The aneroid is located in a chamber 134 open to static pressure, and carries at its movable end a needle 135 which controls the area of an orifice 136 communicating conduit 114 with diaphragm chamber 116, said orifice being balanced against a bleed 137 bypassing impact pressure across the diaphragm 117. As altitude increases, or air density decreases, bellows or aneroid 133 extends itself, decreasing the area of orifice 137, and the pressure in chamber 116 increases, thereby reducing the differential across the diaphragm and giving less travel to the rod 121 for a given pressure difference between impact and static pressure openings 112 and 115, the reverse of the foregoing taking place upon a decrease in altitude.

Overtorque control

Figure 4:
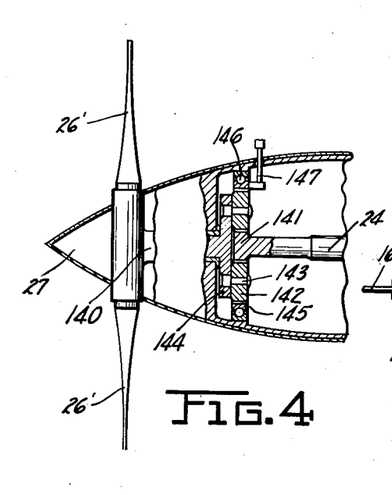
Figures 4 and 5 are detail sectional views of overtorque control mechanism.
Figure 5:
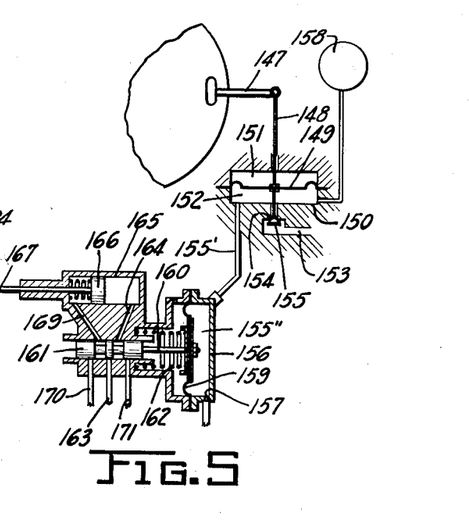

The power and torque of a turbo propeller engine increase quite rapidly with decreasing air temperature as well as with increasing air speed, particularly if a maximum burner temperature is maintained. An overtorque control may therefore be desirable. An example of such type of control is shown in Figures 4 and 5.

The engine or turbine driven shaft 24 drives a propeller shaft 140 through planetary reduction gearing including a sun gear 141 secured on the end of, or formed integrally with the shaft 140, and a plurality of planetary gears 142 mounted on stub shafts 143 projecting from a supporting disc 144 shown formed integrally with the propeller shaft 140. A ring gear 145 has inwardly projecting teeth in engagement with the planetary gears 142, the said ring gear being rotatably supported by a ball race 146. This ring gear is generally stationary except for minor movements when it reacts to torque in a well known manner. A lever 147 projects from the ring gear and at its outer end is pivotally connected to a rod 148 anchored to a diaphragm 149 mounted in a casing 150 and separating the latter into a pair of chambers 151 and 152. Oil or hydraulic fluid under pressure is conducted to the chamber 152 from a source of supply by way of a conduit 153 and port 154 controlled by valve 155. Assuming that the reaction of the propeller drive is such as to cause the ring gear 145 to rotate in a clockwise direction (Figure 4), the rod 148 will move the diaphragm 149 in a direction tending to open the valve 155 and increase the pressure in chamber 152. Oil or hydraulic fluid under pressure is communicated from chamber 152 by way of conduit 155' to a chamber 155" defined by a casing 156 and provided with a relatively small vent 157 which allows oil to escape to a drain chamber or reservoir, not shown, as the valve 155 is closed. Increase in force transmitted through rod 148 to diaphragm 149 opens valve 155 until the pressure in chamber 152 as read on gauge 158 is sufficient to balance the torque reaction of the drive. The pressure in chamber 152 then becomes a direct measure of the torque.

Chamber 155" is subject to the same oil pressure as the chamber 152 and this pressure acts on a diaphragm 159 to which the stem 160 of a servo valve 161 is connected, movement of the diaphragm to the left being opposed by a calibrated spring 162. The servo valve 160, when moved to the left, admits hydraulic fluid such as high pressure oil through conduits 163 and 164 to piston cylinder 165, where it acts on the right hand side of a servo piston 166 having connected thereto a rod 167, in turn connected to a lever 168 (Figure 2) adapted to act on the contact head 66 of the power needle 60 and close the latter to reduce the torque, the oil pressure at this time being drained through conduits 169 and 170. When the servo valve 161 moves to the right, hydraulic fluid flows through the conduit 163 and thence by way of conduit 169 to the cylinder 165 and acts on the left hand side of the piston 166, moving the latter in a direction tending to move the lever 168 away from contact head 66 of the power needle 60 and permit the spring 67 to open said needle, the pressure on the right hand side of the piston 166 draining by way of conduits 164 and 171.

It will thus be seen that when the torque increases beyond a predetermined value sufficient to overcome the resistance of the spring 162, the piston 166, acting through the rod 167 and lever 168, will close the power needle 60, thereby reducing the power output and engine torque, and at the same time permitting a readjustment of propeller pitch.

Overtemperature control

Figure 6:
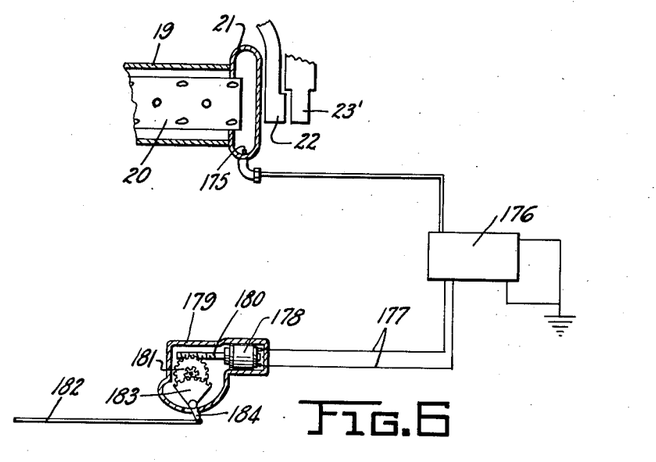
Figure 6 is a sectional diagram of a temperature-limit control.

It may be desirable to provide an overtemperature control which will automatically reduce or cut off feed of fuel to the burner system when the burner exhaust or turbine inlet temperature rises above a predetermined maximum safe value. One example of such a control is illustrated in Figure 6; it is of the electrical type and comprises a thermal pick-up element 175 which may be located at a point where it comes in contact with the hot gases of combustion, as in the collector ring 21, Figure 1, immediately upstream of the turbine 23. The element 175 may include a temperature sensing member and resistance unit such as a carbon pile whose resistance varies with changes in temperature, as where its resistance decreases with increase in temperature, and when a predetermined temperature is reached it causes an unbalance in a resistance bridge circuit or analogous device 176 (which may include amplification) having lead wires 177 connected to the brushes of a small reversible direct current motor 178 mounted in a housing 179 and provided with an armature 180 arranged to drive a worm and gear set 181, which in turn is operatively connected to a rod 182 by means of segmental gear 183 and arm 184. The rod 182 is pivotally connected to the one arm of a pivoted lever 185, see Figure 2, adapted to engage the contact head 66 of the power needle or valve 60 and move the latter toward closed position should burner temperature exceed a predetermined value. When the temperature drops below such predetermined value, the bridge unit 176 is unbalanced in the opposite direction, the motor 178 is reversed and the power needle is permitted to retract through force of spring 67. The motor circuit usually includes suitable limit switches, not shown, for stopping the motor when the lever 184 has moved a predetermined distance in one direction.

Operation, Figures 1–6

In the position of the parts shown in Figure 2, the idle quadrant 56 is in its high idling position, and the idle needle 55 has been fully retracted from the idle orifice 53. It can be assumed that the engine is now idling at maximum idle speed, which purely for the purposes of illustration may be considered as 10,000 R. P. M. since this range may vary widely for different types of engines; and it can also be assumed that high idle represents say 5% power output and a propeller pitch angle of say 6°. If we further assume for convenience that the engine or turbine is driving the propeller at a ten to one reduction, then the propeller would be rotating at a speed of 1000 R. P. M. The engine driven governor servo piston 92' is at a position determined by the correlated adjustment of the governor spring 99 and the governor weights 97, and the basic propeller control lever or element 29 is near its clockwise limit in low or zero pitch position. The initial coordinated setting of the propeller pitch control with respect to opening travel of the fuel feed valve or power needle should be such that the pitch angle follows along a little less than that predetermined as the exact angle for full power absorption at any given fuel feed so that the engine driven propeller pitch governor 94 will come in gradually to increase the pitch and slow down the engine speed as the rate of fuel feed is increased. Assuming zero air speed, then the lever 89 is unaffected by the position of the servo piston 126, while the torque and overtemperature control levers 168 and 185 are sufficiently clear of the power needle 60 to permit full opening movement of the latter.

If now the pilot wishes to increase power output, he rotates the power quadrant 61 to the left or counterclockwise, which is in a direction to retract the power needle 60 from its seat. The propeller pitch angle required for full power at a given air speed may be in the neighborhood of 30°, requiring an advance from idle pitch of 24°. Should the pilot suddenly set the quadrant 61 at wide open throttle or full power position, spring 74 will be compressed and, acting through lever 63, arm 86, lever 89 and rod 90 will slightly rotate the propeller pitch control lever 29 in a pitch increasing direction to bring contact 108, Figure 3, in engagement with contact 108'. The pitch of the propeller now begins to increase, the lever 29 following the adjustment and rotating further in a counterclockwise direction, while at the same time the fuel valve 60 opens to increase the rate of fuel feed, it being assumed, of course, that the effective profile and taper of the power needle 60 is coordinated with the travel of the interconnecting linkage between the power needle and the propeller pitch control so that the propeller pitch setting obtained by motion of the power quadrant will correspond approximately or within a few degrees of that required to absorb the added power resulting from the increase in fuel feed. If the engine speeds up, the engine driven governor 94, acting through the servo valve 98 and servo piston 92' causes the rod 92 to closely follow up the lever 89, so that when the acceleration point is reached, the engine driven governor 94 will have almost instantly corrected for any variance from a predetermined correlation of power output and propeller pitch setting.

Should the propeller pitch require correction for the particular air speed prevailing at the rate of travel of the aircraft at a given altitude, then the piston 126 will position the lever 89 to give the required correction.

Upon a decrease in air density, say to half of that obtained in the above example of operation, then due to the density control circuit including the aneroid 75, approximately only half the fuel will be delivered to the burners at the same area of the fuel feed orifices 53 and 54, while at the same time, due to the rare air or decreased density, the propeller will require approximately only half the power to drive the same at a given pitch. Thus, a given travel or area regulating movement of the fuel valve 60 at one altitude will produce substantially the same engine speed at all altitudes and will call for substantially the same propeller pitch for corresponding engine speeds, neglecting variations in air speed. This operation is inherent in the combination herein disclosed, since the fuel head across the fuel valve is caused to automatically vary with changes in altitude or air density while a given travel of the fuel valve produces substantially the same engine speed at all altitudes.

For the same position of the pilot's quadrant at a given altitude but different air speeds, the piston rod 92 controlled by the engine driven governor 94 and the rocking lever 89 may take different pitch regulating positions. For example, should the plane go into a stall with substantially no forward speed, the propeller might have a 6° angle from zero or a flat position, and at 400 miles per hour it may have an 18° angle, the difference of 12° representing the spiral of advance of the mean propeller pitch. Thus, opening the throttle at a stalled position or zero air speed might mechanically change the propeller pitch from say 6° to 30°, an increase of 24°, while at 400 miles per hour the same throttle opening should produce the same increase, or should advance the pitch from say 18° to 42°; and to whatever extent this might be off, the engine driven governor 94 would correct. At any altitude and air speed, quick opening movement of the power needle is accompanied by a simultaneous coordinated increase in propeller thrust, with but a relatively small increase in engine speed and following governor correction. On quick throttle closing, the action is reversed, the fuel throttle closing quickly and the propeller pitch decreasing by a corresponding increment, all without throwing major corrective duty on the propeller pitch governor 94.

Should the torque of the engine increase beyond a predetermined safe value, the overtorque control described in connection with Figure 3 operates the lever 168 to reduce the feed of fuel to the engine so that the latter will drop back to a safe speed, or a speed which will insure against excessive temperatures and resulting damage to the engine. The overtemperature control of Figure 6 will act to reduce fuel feed in the same manner should a predetermined maximum temperature be exceeded.

Figure 7:
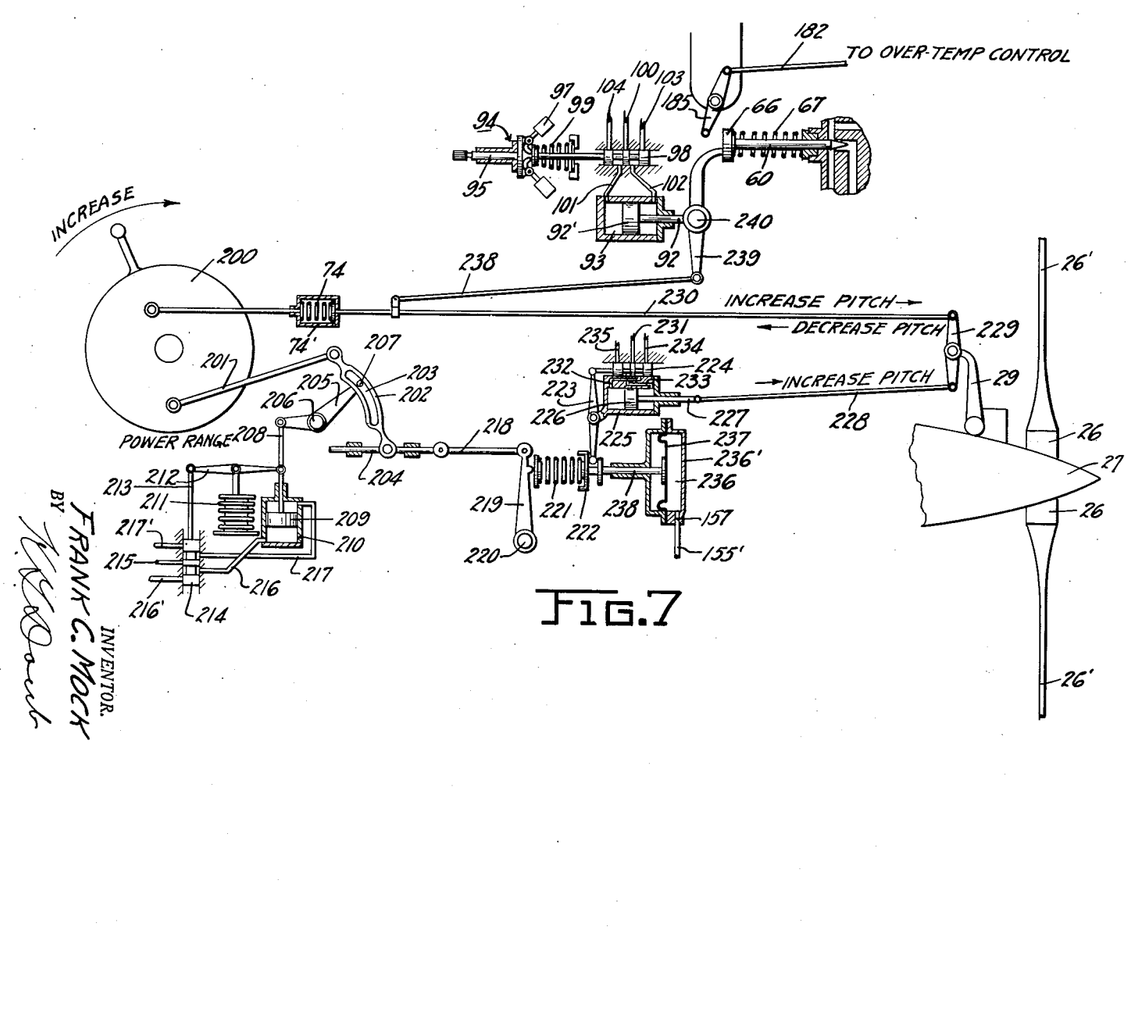
Figures 7 and 8 are schematic views of modified types of controls with respect to that of Figure 1.

*Figure 7*

In the form of control shown in Figure 7, the pilot's power control quadrant, here indicated at 200, simultaneously selects fuel feed and torque, the rate of fuel feed being subject to correction for overspeeding by the engine driven governor 94 and also by the overtemperature control of Figure 6. In order to obtain prompt response of propeller thrust in relation to travel or movement of the pilot's quadrant, the latter has an operating link connected to the propeller pitch control element 29, which latter, however, is subject to correction as necessary by the torque control of Figures 4 and 5. Preferably, the fuel feed and torque selection are both corrected for changes in density of the air flowing to the engine, or ram density.

The power quadrant 200 has pivotally connected thereto a link rod 201, which in turn is connected to a lever 202, formed with a slot 203 and pivoted at its lower end to a slidable push rod 204. A bell crank lever 205 is pivotally anchored or fulcrumed at 206, and one arm of this lever carries a pin 207 which engages in the slot 203 while the other arm thereof is connected to a piston rod 208 which in turn is connected to a servo piston 209 mounted in a cylinder 210. An aneroid 211, preferably responsive to both ram pressure and temperature, has its movable end connected to the intermediate portion of a lever 212, which in turn connects at one end by means of a link 213 with a servo valve 214 and at its opposite end with the piston rod 208. When air density decreases, the aneroid or bellows 211 expands and raises the servo valve 214, whereupon hydraulic fluid such as high pressure oil flows to the cylinder 210 by way of conduits 215 and 216 and acts on the under side of piston 209, oil draining from the upper side of said piston by way of conduits 217 and 217'; and when the air density increases and the aneroid or bellows 211 collapses, the servo valve 214 is lowered or moved in the opposite direction, thereby admitting high pressure fluid to the upper side of the piston 209 by way of conduits 215 and 217, the oil draining from the lower side of said piston by way of conduits 216 and 216'. At high air densities such as prevail at low altitudes, the lever 205 will be in approximately the position shown in Figure 7, so that a relatively short motion of the rod 201 gives a relatively long travel to the rod 204; but as the pressure and/or temperature of the ambient air decreases, the lever 205 will rotate clockwise and move the pivot 207 downwardly in the slot 203, so that for a given travel of rod 201, there will be less travel of the rod 204.

The rod 204 is pivotally connected at its right hand end to a link rod 218, which in turn is pivoted to the upper end of an arm 219 rotatably anchored at 220 and adapted to compress a torque control spring 221. When this spring is compressed, it acts through a movable yoke member 222 and lever 223 to adjust a servo valve 224, which controls admission of hydraulic fluid to a cylinder 225 mounting a servo piston 226, the latter having a piston rod 227 pivotally connected to the adjacent end of a link rod 228, the opposite end of the rod 228 being pivotally connected to the one arm of a lever 229, the other arm of which is connected to a link rod 230 extending back and connected to the pilot's quadrant 200. When the torque spring 221 is compressed, the servo valve 224 is moved to the left and high pressure or hydraulic fluid flows to the left hand side of the piston 226 by way of conduits 231 and 232 while fluid drains from the right hand side of said piston by way of conduits 233 and 234, and when the servo valve 224 is moved to the right by torque responsive diaphragm 237, high pressure fluid is admitted to the right hand side of the piston 226 by way of conduits 231 and 233 while drainage takes place by way of conduit 232 and 235.

When the piston 226 moves to the right, it acts on the propeller pitch control element 29 to increase the propeller pitch. Increase of pitch is accompanied by an increase in torque at a given engine speed, which torque increase is measured by the torque control device of Figures 4 and 5, producing a change in pressure in chamber 236 defined by a casing 236'. This pressure acts on the right hand side of diaphragm 237, which in turn acts on a rod 238 connected to the yoke member 222, moving the servo valve 224 to the right and admitting hydraulic pressure to the right hand side of the piston 226, to thereby prevent further increase of the propeller pitch. The servo arrangement is preferably such that when the pressure on diaphragm 237 equals or balances the opposed pressure on spring 221, the propeller pitch will cease to increase or will remain at a pitch determined by the pilot's control quadrant as corrected by torque. The chamber 236 is connected by way of conduit 155' to chamber 152 of the torque meter of Figures 4 and 5, heretofore described.

The fuel control apparatus of Figure 7 is substantially the same as that shown in Figure 2. However, in this instance, the power needle or fuel valve 60 is directly operated from the pilot's control quadrant 200 through links 230 and 238, the latter being pivoted to a lever 239, fulcrumed at 240 to the piston rod 92 of the engine speed responsive servo piston 92'. The engine driven governor 94 operates in a manner such that as and when the engine overspeeds, the governor weights 97 overcome the pressure of the spring 99 and move the servo valve 98 to the right, which in turn moves the servo piston 92' to the right and reduces the opening of the power needle 60, the latter being also subject to the overtemperature control shown more or less in detail in Figure 6.

*Operation, Figure 7*

Assuming that the engine is idling with the propeller blades in a near zero or no-thrust position and the pilot's control quadrant 200 in its low power position, which is to the left in Figure 7, then as the quadrant is rotated to the right, there will be a resilient opening thrust exerted on the power needle 60 through rod 230, spring 74 and rod 238, and also on the propeller pitch control lever 229, and this action will also compress the spring 221 and influence the servo valve 224 and servo piston 226 in a direction tending to set the torque valve and produce an increase in the propeller pitch as the torque builds up.

The profile of the power needle, the relative movement of the control levers and interconnecting linkage between the power needle and the propeller pitch control are coordinated so that operation of the pilot's quadrant 200 gives an approximate selection of fuel flow, propeller pitch and torque. If the fuel flow should be at a rate too great for the pitch, the torque will also be too great for the pitch and the engine will tend to speed up, but the governor weights 97 will immediately act to close the fuel valve and reduce engine speed. Simultaneously, if the torque should be too great for the setting of the spring 221, the servo valve 224 will operate the piston 226 to decrease the pitch of the propeller blades, which action in turn will tend to increase engine speed and require another fuel feed adjustment from the engine driven governor 94. Should there be an increase in temperature above a predetermined safety value, the overtemperature control will immediately respond to reduce fuel flow in a manner heretofore described.

If desired, the rocking lever 229 may be eliminated and the rod 228 connected directly to the propeller pitch control lever 29, in which case the rod 230 would also be eliminated and the rod 238 arranged to provide an interconnection between the pilot's quadrant 200 and the fuel control lever 239.

Figure 8:
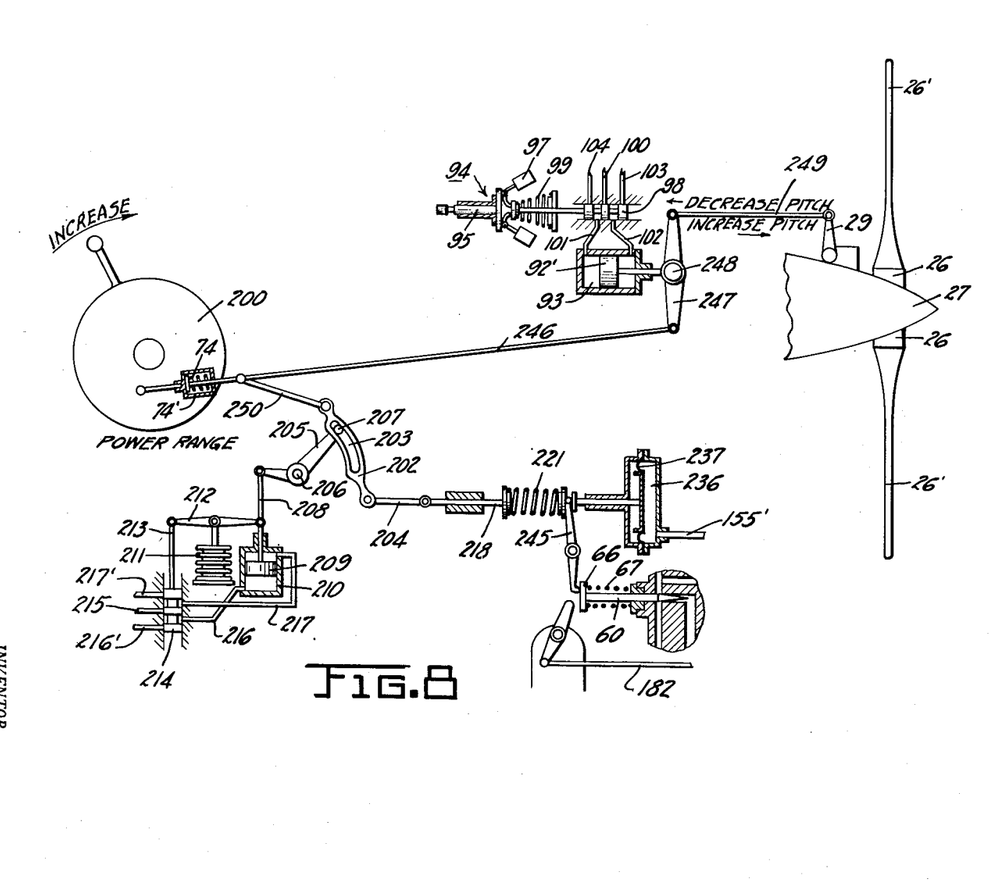

*Figure 8*

In Figure 8 the parts which go to make up the control are arranged in a manner such that the torque selector regulates the fuel valve while the engine driven governor and the pilot's control lever jointly control the propeller pitch. By balancing the torque increase against the fuel valve opening, a more positive control results.

Parts in Figure 8 which correspond to like parts in Figure 7 are given similar reference numerals. It will be noted that the operating connection from the pilot's quadrant 200 to the torque control spring 221 is substantially the same as in Figure 7. Torque meter fluid pressure build-up is communicated through conduit 155' to the chamber 236 to give a left hand thrust on the diaphragm 237 which, as far as the spring 221 permits, rotates a rocking lever 245 counterclockwise and reduces the opening of the fuel valve or power needle 60. The fuel control system may be similar to that heretofore described except that the aneroid 75 may be omitted, since the control pressure of the torque control spring 221 varies with altitude. The propeller pitch control element 29 is operated from the power quadrant 200 by means of a link rod 246 having the resilient coupling 74, 74' therein and pivotally connected at its one end to the adjacent end of a rocking lever 247, which in turn is pivotally fulcrumed at 248 to the piston rod 92 of the engine driven governor actuated piston 92', the opposite end of the said lever 247 being connected by means of a link rod 249 with the propeller pitch control element 29. Another link rod 250 pivotally connects rod 246 with the slotted lever 202.

*Operation, Figure 8*

Movement of the pilot's control quadrant 200 in a clockwise direction simultaneously tends to increase the propeller pitch through its resilient connection with the propeller pitch control element 29 and at the same time it also compresses the torque control spring 221 against which the torque fluid pressure acts and tends to open the fuel valve or power needle 60. Increasing the propeller pitch for the particular existing engine speed will increase the torque, which in turn will result in an increase in pressure in chamber 236; and if this pressure is too great for the existing compression force of the spring 221, it will reduce the rate of fuel feed. This may result in less torque than is necessary to maintain the engine speed at the particular propeller pitch selected by the pilot's quadrant, in which case the engine will slow down and the engine driven governor 94 will decrease the pitch until the predetermined speed is maintained for the desired torque. It is important that the travel of the spring 221 and taper of the power needle or fuel valve 60 be properly coordinated; and in this respect additional structure other than that shown may be utilized, for example, cam means may be used for transmitting motion from the spring to the fuel valve. The temperature control element operates on the fuel valve to reduce the fuel feed in case of excess temperature, as in the previously described controls.

It will be understood that in the main the control apparatus has been illustrated schematically to conserve space in the drawings, and that in actual practice the parts of the system may be arranged in any manner desired, and known mechanical movements other than those shown may be employed to carry out the various functions and operations within the scope of the invention as defined by the appended claims.

I claim:

1. In a power control system for a gas turbine propeller engine having a variable pitch propeller, pitch-changing mechanism having a movable control element, a fuel feeding system including a variable feed restriction and a valve movable to different positions to vary the area of said restriction, means responsive to changes in entering air density for varying the fuel head across the valve, means interconnecting said propeller pitch control element and said feed valve for correlating propeller pitch and power output for approximately full power absorption closely following a change in setting of said valve, and a constant speed engine driven governor arranged to follow said propeller pitch control element and adjust the final setting of the latter to maintain engine speed substantially constant following a change in the power output of the engine.

2. In a power control system for a gas turbine propeller engine drivably connected to a variable pitch propeller, a fuel supply conduit having a variable feed restriction therein and a manually operable valve movable to different positions to vary the area of said restriction, means responsive to changes in air density for varying the fuel head across said feed restriction at any given position of said valve so that travel of the latter is substantially the same at varying altitudes in controlling power output, propeller pitch changing mechanism including motor means operative to produce a change in pitch of the propeller blades independently of engine speed, a movable control element for said motor means, means resiliently interconnecting said propeller pitch control element and said feed valve for obtaining at least approximately full power absorption substantially simultaneously with a change in setting of the feed valve, and an engine driven governor having an element coacting with said propeller pitch control element to adjust the latter as a direct function of engine speed following a change in the power output of the engine.

3. In a power control system for gas turbine propeller engines, in combination, a variable pitch propeller provided with propeller pitch-changing mechanism operative to produce a change in pitch of the propeller blades independently of changes in engine speed, a movable control element for said mechanism, a selectively operable power control member connected to said control element for adjusting propeller pitch, an engine driven governor provided with a movable element also connected to said control element for modifying the action of the latter as a function of engine speed, a fuel metering device including a valve movable to different positions to vary the rate of fuel feed, a device responsive to changes in engine torque operatively connected to said valve, means for setting the feed valve and simultaneously adjusting the effective action of said torque device, said selectively operable power control member being also connected to said latter means whereby movement of the said power control member adjusts the propeller pitch with a correction by the engine driven governor as a function of engine speed and simultaneously therewith adjusts the rate of fuel feed with a correction as a function of engine torque.

4. In a power control system for gas turbine propeller engines, in combination, a fuel metering device including a valve movable to different positions to vary the rate of fuel feed, an adjustable device responsive to changes in engine torque, a manually operable power control member operatively connected to said valve and torque device for simultaneously selecting the rate of fuel feed and adjusting said torque device, and means responsive to changes in density of the air flowing to the engine for modifying the effective action of said power control member.

5. A power control system as claimed in claim 4 wherein the propeller is of the variable pitch type and is provided with pitch control mechanism having a control element movable to different positions to vary the pitch of the propeller blades and said power control member is also connected to said control element whereby propeller pitch is correlated with fuel feed and torque, and in addition an engine driven governor is connected to said control element to modify its setting as a function of engine speed.

References Cited in the file of this patent

UNITED STATES PATENTS

| | | | |
|---|---|---|---|
| Re. 22,661 | Gosslau et al. | Aug. 7, | 1945 |
| 1,427,830 | McCauley | Sept. 5, | 1922 |
| 1,517,289 | Hart | Dec. 2, | 1924 |
| 2,115,485 | Dodson | Apr. 26, | 1938 |
| 2,262,022 | Lundquist et al. | Nov. 11, | 1941 |
| 2,303,998 | Holley | Dec. 1, | 1942 |
| 2,306,953 | Jung | Dec. 29, | 1942 |
| 2,336,232 | Doran | Dec. 7, | 1943 |
| 2,347,104 | Hooves | Apr. 18, | 1944 |
| 2,378,037 | Reggio | June 12, | 1945 |
| 2,378,580 | Prause et al. | June 19, | 1945 |
| 2,389,003 | Schorn | Nov. 13, | 1945 |
| 2,423,183 | Forsyth | July 1, | 1947 |
| 2,427,846 | Forsyth | Sept. 23, | 1947 |
| 2,437,546 | Meripoe | Mar. 9, | 1948 |
| 2,442,049 | Lee | May 25, | 1948 |
| 2,457,595 | Orr | Dec. 28, | 1948 |
| 2,482,460 | Browne | Sept. 20, | 1949 |
| 2,499,161 | Pitcairn | Feb. 28, | 1950 |
| 2,499,376 | Ferrill | Mar. 7, | 1950 |
| 2,499,813 | Brady | Mar. 7, | 1950 |
| 2,521,244 | Moore | Sept. 5, | 1950 |
| 2,525,460 | Roesch | Oct. 10, | 1950 |
| 2,552,131 | Adams | May 8, | 1951 |
| 2,618,927 | Chandler | Nov. 25, | 1952 |

FOREIGN PATENTS

| | | | |
|---|---|---|---|
| 470,492 | Great Britain | Aug. 12, | 1937 |
| 883,676 | France | Mar. 29, | 1943 |
| 913,010 | France | May 20, | 1946 |